United States Patent [19]

Korn et al.

[11] 4,200,309
[45] Apr. 29, 1980

[54] SAFETY STEERING WHEEL FOR MOTOR VEHICLES

[75] Inventors: Hans Korn, Hanau; Klaus Grothe, Aschaffenburg; Wolfgang Bauer, Mainaschaff, all of Fed. Rep. of Germany

[73] Assignee: Karl Schmidt GmbH, Neckarsulm, Fed. Rep. of Germany

[21] Appl. No.: 927,710

[22] Filed: Jul. 24, 1978

Related U.S. Application Data

[63] Continuation-in-part of Ser. No. 733,541, Oct. 18, 1976, abandoned.

[30] Foreign Application Priority Data

Nov. 4, 1975 [DE] Fed. Rep. of Germany ....... 2549285

[51] Int. Cl.$^2$ ............................................. B60R 21/02
[52] U.S. Cl. ..................................... 280/750; 74/552
[58] Field of Search .................. 280/87 R, 87 A, 750, 280/777; 180/78; 74/492, 552

[56] References Cited

U.S. PATENT DOCUMENTS

| | | | |
|---|---|---|---|
| 3,285,091 | 11/1966 | Fiala | 280/750 X |
| 3,495,474 | 2/1970 | Nishimura et al. | 280/777 X |
| 3,534,628 | 10/1970 | Barenyi | 280/777 X |
| 3,992,041 | 11/1976 | Vernocchi | 280/750 |
| 4,098,525 | 7/1978 | Schwanz et al. | 280/750 |

FOREIGN PATENT DOCUMENTS 2549285 12/1977 Fed. Rep. of Germany ........... 280/750

*Primary Examiner*—Robert R. Song
*Assistant Examiner*—Michael Mar
*Attorney, Agent, or Firm*—Sprung, Felfe, Horn, Lynch & Kramer

[57] ABSTRACT

A steering wheel for motor vehicles comprises a rim, a hub recessed from the rim and spokes connecting the rim to the hub. A deformable box-shaped member is connected to the spokes and disposed between the hub and the rim of the steering wheel for deforming movement relative to the rim, spokes and hub. The deformable member deforms to cushion the blow to an operator upon impact by an operator during a collision.

5 Claims, 5 Drawing Figures

SAFETY STEERING WHEEL FOR MOTOR VEHICLES

This application is a continuation-in-part of application Ser. No. 733,541 filed Oct. 18, 1976, now abandoned.

BACKGROUND OF THE INVENTION

The present invention relates to a bowl-shaped steering wheel for motor vehicles, in which the hub of the steering wheel is recessed from the rim of the wheel and a deformable member is provided between the hub and rim of the steering wheel.

Bowl shaped steering wheels are known and have been described, e.g., in U.S. Pat. No. 2,946,869. They afford a certain degree of safety against injury in case of an accident because the hub is recessed from the rim of the steering wheel and when the driver is thrown forwardly in case of an accident, the upper part of his body is intercepted by the rim of the steering wheel.

In an attempt to distribute the impact of the body over an area which is as large as possible, a steering wheel described in printed German Application 18 15 130 has been provided with an impact-receiving member which is cushioned and has a large surface area arranged within the rim of the steering wheel.

It is also known to provide cup- or bowl-shaped deformable members, which are disposed between the rim and hub of the steering wheel and which in case of accidents involving an impact perform work of deformation to take up the kinetic energy of the driver thrown against the steering wheel and thus reduce the risk of injury (Opened German Specification No. 18 17 337; German Utility Model 18 88 896).

Printed German Application 19 12 528 discloses a steering wheel comprising a member which provides an impact-receiving surface and which in case of accidents cooperates with a deformable tubular member, which is connected to the hub of the steering wheel. The deformable member consists of a sheet metal element, which has been roll-formed to a tubular shape, welded, and provided with diamond-shaped apertures to form a grid comprising a plurality of pairs of strips which extend from a common point.

These known deformable members have the disadvantage that their flexural rigidity is comparatively high so that they cannot perform the desired function or cannot perform it satisfactorily because they take up the work of deformation only under a comparatively high load so that they do not generally afford protection in case of an impact of the head on the steering wheel.

SUMMARY OF THE INVENTION

In a safety steering wheel of the kind described first hereinbefore, the invention provides a deformable member which is disposed between the rim and the hub of the steering wheel and which is designed to be fully effective in case of an impact of the head.

In accordance with the invention this is accomplished in a bowl-shaped safety steering wheel with a substantially box-shaped, energy-absorbing deformable member of sheet metal which is disposed between the rim and hub of the steering wheel and wherein the axial height of the member and the extent to which it can be deformed preferably correspond approximately to the distance between the plane of the rim of the steering wheel and that edge of the hub of the steering wheel which is disposed on the steering wheel side of said hub.

At its two longitudinal sides and/or transverse sides, the deformable member either rests against or is secured to the spokes and/or hub of the steering wheel.

The sides consist of deep drawn light-gauge sheet metal, which is formed with furrows or other recesses that provide for a deformation in the desired direction.

BRIEF DESCRIPTION OF THE DRAWINGS

The invention is shown by way of example and will be explained more fully hereinafter with reference to.

DETAILED DESCRIPTION OF THE INVENTION

Figure 1:
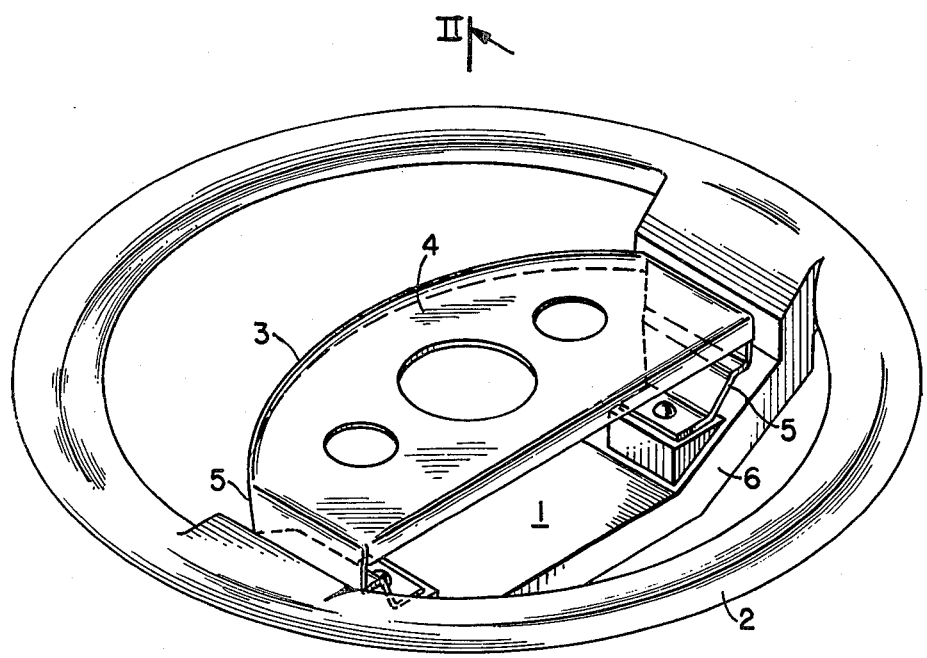
FIG. 1 is a top perspective view of a bowl-shaped steering wheel according to the present invention.
Figure 2:
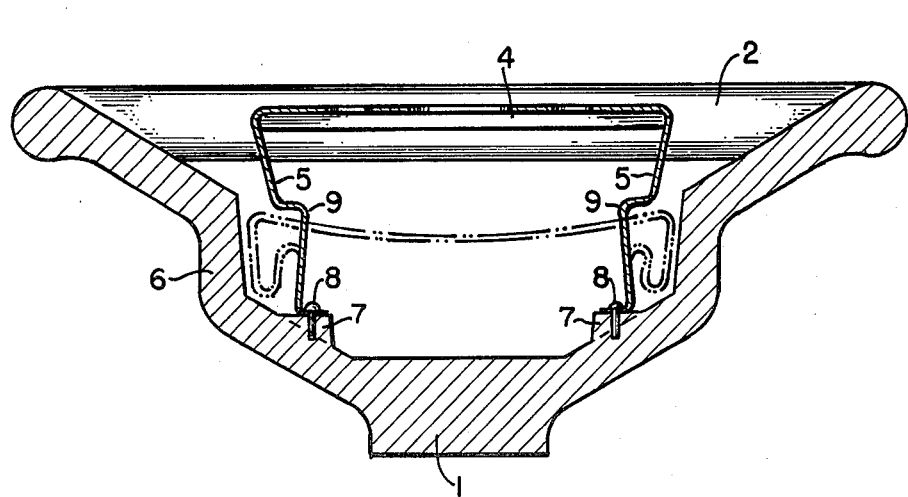
FIG. 2 is a longitudinal sectional view of FIG. 1 through line II—II.

Referring now to FIGS. 1 and 2, the bowl-shaped safety steering wheel comprises a hub 1, which is recessed from the rim 2 and which are connected together by spokes 6.

The deformable box-shaped member 3 includes a substantially flat top portion 4 which may have assorted apertures therein for receiving indicia or other vehicle devices, and transverse side portions 5 which are formed with at least one furrow 9.

In the embodiment shown, the transverse sides 5 are connected to the steering wheel via bosses 7 which are carried by the spokes 6 and screws 8 which bolt the end portions of the transverse sides to the bosses 7.

In use, in the event of a collision wherein the head of the vehicle driver is thrust forwardly into the steering wheel, if the driver's head strikes the top portion 4 of the deformable member 3, the deformable member 3 will deform such as shown in FIG. 2 by the dotted lines such that the transverse sides will bend around the furrows 9 and the top portion 4 will move downwardly towards the hub. In this way, the deformable member 3 will absorb some of the impact to protect the driver's head.

Figure 3:
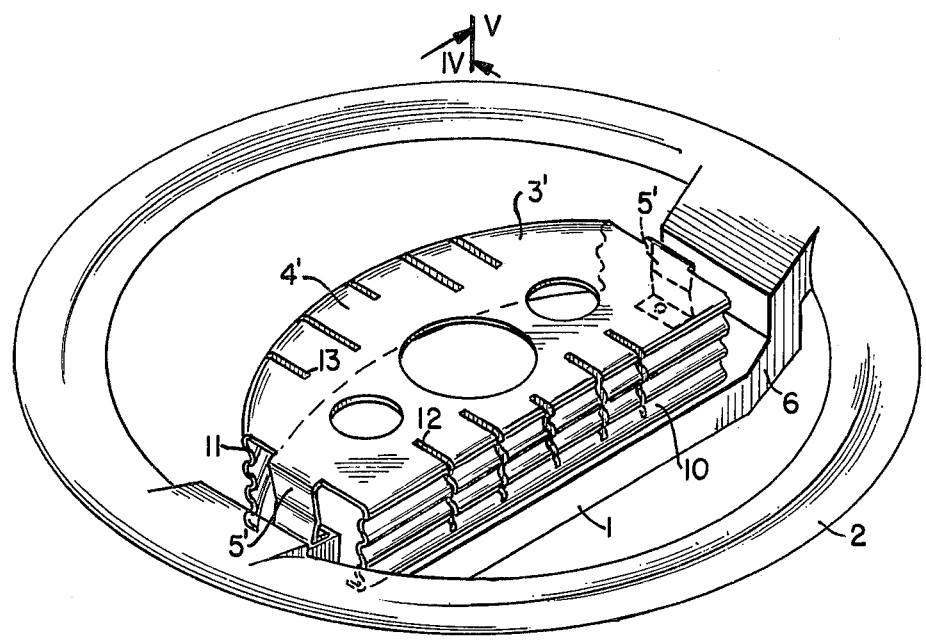
FIG. 3 is a top perspective view showing another embodiment of the bowl-shaped steering wheel in accordance with the present invention.
Figure 4:
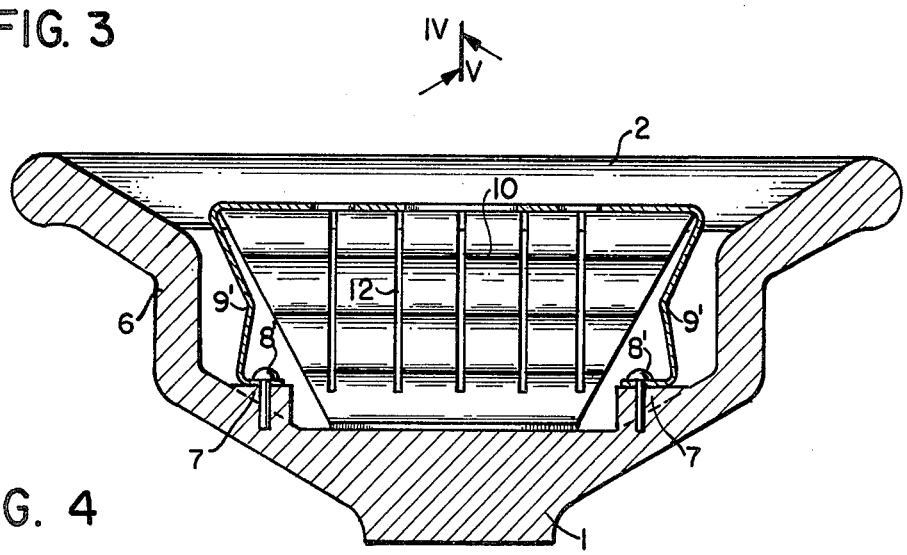
FIG. 4 is a longitudinal sectional view through line IV—IV in FIG. 3.
Figure 5:
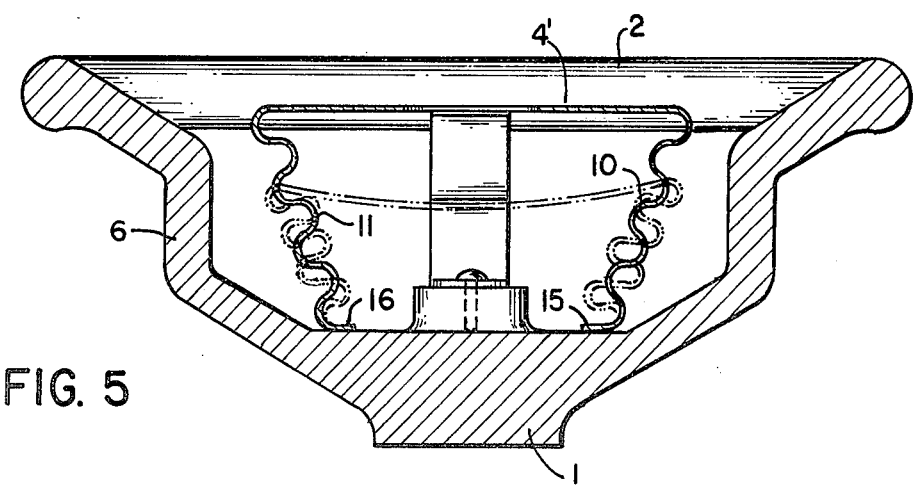
FIG. 5 is a longitudinal sectional view along line V—V in FIG. 3.

Referring now to FIGS. 3–5, another embodiment is shown of the box-shaped deformable member 3'. In this embodiment, the box-shaped member has the equivalent top portion 4', transverse sides 5' having furrows 9' therein and which are connected via bolts 8' to bosses 7 on the spokes 6 of the steering wheel.

In this embodiment, the box-shaped member 3' has longitudinal sides 10 and 11 which are corrugated as is clearly shown in FIGS. 3 and 5 and which also has slots 12 and 13 therein in order to facilitate the deformation thereof in the event of an impact.

In the embodiment shown, the transverse sides 5' are secured to the spokes, while the end portions 15 and 16 of longitudinal sides 10 and 11 rest against the hub but are not necessarily secured thereto.

In operation, upon impact of the vehicle driver's head with the top portion 4' of the box-shaped member 3', deformation will occur as shown by the dotted lines in FIG. 5. The top portion 4' will move downwardly while the corrugated walls 10 and 11 deform as shown and the transverse sides deform as shown in FIG. 2.

As can be clearly seen from the figures and the description of the invention, the deformable member deforms and is therefore movable with respect to the hub, rim and spokes of the steering wheel during the impact by the head of a driver.

The deformable box member can have a comparatively low flexural rigidity which makes it useful for absorbing the impact by the head of a driver and it is arranged in the zone of the plane of the rim where impacts of the head are usual and therefore the deformable member will absorb the impact of the driver's head in most cases.

It will be appreciated that the instant specification and claims are set forth by way of illustration and not limitation and that various changes and modifications may be made thereto without departing from the spirit and scope of the present invention.

What is claimed is:

1. Steering wheel for motor vehicles comprising: a rim, a hub recessed from the rim, spokes connecting the rim to the hub and deformable means disposed between the hub and rim, said deformable means comprising a substantially box-shaped, energy-absorbing deformable member of sheet metal disposed between the hub and rim of the steering wheel having two base portions connected to the spokes and stationary with respect to the rim, spokes and hub, deformable sides and a substantially nondeforming top portion movable relative to the rim, spokes and hub in response to the deformation of the sides each side being provided with a plurality of spaced longitudinal slots extending partially into the top portion and then downwardly along said side thereby subdividing each side into a plurality of independently deformable elements, the axial height of said member and the extent to which it can be deformed corresponding approximately to the distance between the plane of the rim of the steering wheel and that edge of the hub of the steering wheel which is disposed on the steering wheel side of said hub, whereby upon impact by a vehicle operator the deformable member deforms to cushion the blow of the operator.

2. Steering wheel of claim 1 wherein the base portions are connected to the deformable member at its two longitudinal sides and one end of each of the two transverse sides rests against the hub.

3. Steering wheel of claim 2, wherein the longitudinal sides of the deformable member are formed with furrows that provide for a deformation in the desired direction.

4. Steering wheel of claim 3, wherein the longitudinal sides are corrugated for effecting deformation.

5. Steering wheel of claim 1, wherein the base portions connected to the deformable member at its two transverse sides and one end of each of the two longitudinal sides rests against the hub.

* * * * *